US 10,777,861 B2

(12) United States Patent
Halsey et al.

(10) Patent No.: US 10,777,861 B2
(45) Date of Patent: Sep. 15, 2020

(54) BATTERY PACK

(71) Applicant: GE Aviation Systems Limited, Gloucestershire (GB)

(72) Inventors: Colin John Halsey, Tewkesbury (GB); Michael James Smith, Chadlington (GB)

(73) Assignee: GE Aviation Systems Limited, Gloucestershire (GB)

( * ) Notice: Subject to any disclaimer, the term of this patent is extended or adjusted under 35 U.S.C. 154(b) by 75 days.

(21) Appl. No.: 15/976,241

(22) Filed: May 10, 2018

(65) Prior Publication Data

US 2018/0358671 A1  Dec. 13, 2018

(30) Foreign Application Priority Data

Jun. 9, 2017  (GB) .................................. 1709184.4

(51) Int. Cl.

| | |
|---|---|
| *H01M 10/6557* | (2014.01) |
| *H01M 2/10* | (2006.01) |
| *H01M 10/613* | (2014.01) |
| *H01M 10/0525* | (2010.01) |
| *H01M 2/30* | (2006.01) |
| *H01M 10/625* | (2014.01) |

(52) U.S. Cl.
CPC ..... *H01M 10/6557* (2015.04); *H01M 2/1077* (2013.01); *H01M 2/1094* (2013.01); *H01M 2/30* (2013.01); *H01M 10/0525* (2013.01); *H01M 10/613* (2015.04); *H01M 10/625* (2015.04); *H01M 2220/20* (2013.01)

(58) Field of Classification Search
CPC ........... H01M 10/6557; H01M 10/625; H01M 2/1094; H01M 10/0525; H01M 10/613; H01M 2/1077
See application file for complete search history.

(56) References Cited

U.S. PATENT DOCUMENTS

| | | |
|---|---|---|
| 5,702,840 A | 12/1997 | Byon |
| 8,273,474 B2 | 9/2012 | Al-Hallaj et al. |
| 8,409,736 B2 | 4/2013 | Wang et al. |
| 8,785,026 B2 | 7/2014 | Hu et al. |
| 2009/0111015 A1 | 4/2009 | Wood et al. |

(Continued)

FOREIGN PATENT DOCUMENTS

| | | |
|---|---|---|
| CN | 105280983 A | 1/2016 |
| JP | H1021891 A | 1/1998 |

(Continued)

OTHER PUBLICATIONS

Great Britain Combined Search and Examination Report issued in connection with corresponding GB application No. 1709184.4 dated Nov. 20, 2017.

*Primary Examiner* — Stewart A Fraser (74) *Attorney, Agent, or Firm* — McGarry Bair PC (57) ABSTRACT

A battery pack for carrying one or more battery cells in the battery pack can include a chassis defining a body for holding the battery cells. The chassis can include a set of vertical battery cell holders adapted to hold the battery cells. A set of horizontal passages can be provided in the chassis between the set of vertical battery cell holders. A cap assembly can be provided at one end of the battery cells and within the body providing venting for the battery cells through the battery cell holders.

18 Claims, 10 Drawing Sheets

(56) References Cited

U.S. PATENT DOCUMENTS

| | | | |
|---|---|---|---|
| 2010/0291422 A1* | 11/2010 | Deng | H01M 2/0413 |
| | | | 429/82 |
| 2011/0091774 A1 | 4/2011 | Chow | |
| 2011/0223452 A1* | 9/2011 | Yoshida | H01M 2/1072 |
| | | | 429/83 |
| 2011/0293986 A1 | 12/2011 | Kozu | |
| 2015/0064514 A1 | 3/2015 | Wu et al. | |
| 2015/0270590 A1 | 9/2015 | Okutani et al. | |

FOREIGN PATENT DOCUMENTS

| | | |
|---|---|---|
| JP | 2003109674 A | 4/2003 |
| JP | 2014170613 A | 9/2014 |

* cited by examiner

BATTERY PACK

BACKGROUND OF THE INVENTION

Battery packs can include one or more cell stacks configured in parallel and series combinations to achieve a desired operating voltage and a current capacity for use throughout a vehicle such as an aircraft. Unfortunately, with Lithium-Ion cell chemistry in particular, when one battery cell in the cell stack is failing, the increase in temperature can lead to a thermal runaway that can cascade to cause a catastrophic failure in the entire cell stack.

SUMMARY OF THE INVENTION

In one aspect, the disclosure relates to a chassis for a battery pack including a body defining a first surface and a second surface, opposite and spaced from the first surface. A set of vertical battery cell holders are located within the body and extending between the first surface and the second surface. A set of horizontal passages are located within the body and interconnecting at least two adjacent battery cell holders of the set of battery cell holders. The set of horizontal passages are spaced along at least a portion of a vertical length of the body. A set of vertical cooling passages are located within the body and extend between the first surface and the second surface. One vertical cooling passage is located between at least two adjacent of the set of vertical battery cell holders and vertically connects the set of horizontal passages that are spaced along at least a portion of a vertical length of the body.

In another aspect, the disclosure relates to a chassis for a battery pack including a body defining a first surface and a second surface, opposite and spaced from the first surface. A set of vertical battery cell holders is located within the body and extends between the first surface and the second surface. An electrically conductive high melting point mesh is located within a battery cell holder of the set of vertical battery cell holders and configured to surround a battery cell.

In yet another aspect, the disclosure relates to a cap assembly for a lithium ion battery including an insulating grommet having a body defining a first end and a second end with a through opening therein passing from the first end of the body to the second end of the body and a set of passages that extend from a first portion radially outward to a second portion.

DETAILED DESCRIPTION OF THE DISCLOSURE

On aircraft the electrical power distribution system services various consumer loads around the aircraft. Battery packs used to store and provide electrical power throughout the aircraft, or provide auxiliary power as may be required. On modern aircraft the increased number of services demands can increase the required capacity of the battery pack, as well as a heightened need for reliability operating under higher demands, which can lead to heightened operational temperatures within the battery pack. Furthermore, the increased demands can lead to increased cell breakdown. Aspects of the disclosure describe a battery pack adapted to facilitate the individual cell breakdown process without disturbance to the adjacent cells and consequently the entire battery pack.

Heightened demands due to increasing efficiency demands, increased operational demands, and energy costs can lead to higher temperatures and a higher potential for failure of one or more batteries within the battery pack due to cell breakdown. Cell breakdown is usually a three-stage process. The first stage can include the solid electrolyte interphase layer being exposed to excessive temperatures, which can start at temperatures under 80° C. Once this layer is compromised, the electrolyte reacts with the carbon anode. This reaction is exothermic, driving temperatures higher. The second stage can occur when temperatures approach 110° C. In the second stage, the organic solvents in the electrolyte decompose and release flammable hydrocarbon gases. While the lack of oxygen typically prevents combustion of such gases, local pressure increase due to the release of gases with no egress can lead to cell failure. Some cells include a safety vent to release the gases in a controlled manner, however the release of such gases is typically to an oxygenated environment, leading to potential for combustion of the released gases. Within the cell, the temperatures can continue to increase, leading to the third stage where the metal oxide cell cathode decomposes. This decomposition is also exothermic, further increasing temperature. Furthermore, this decomposition releases oxygen into the decomposed electrolyte gases and can cause spontaneous ignition of the hydrocarbon gases, which are already heated beyond their flashpoint temperatures.

While "a set of" various elements will be described, it will be understood that "a set" can include any number of the respective elements, including only one element. Additionally, all directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

Figure 1:
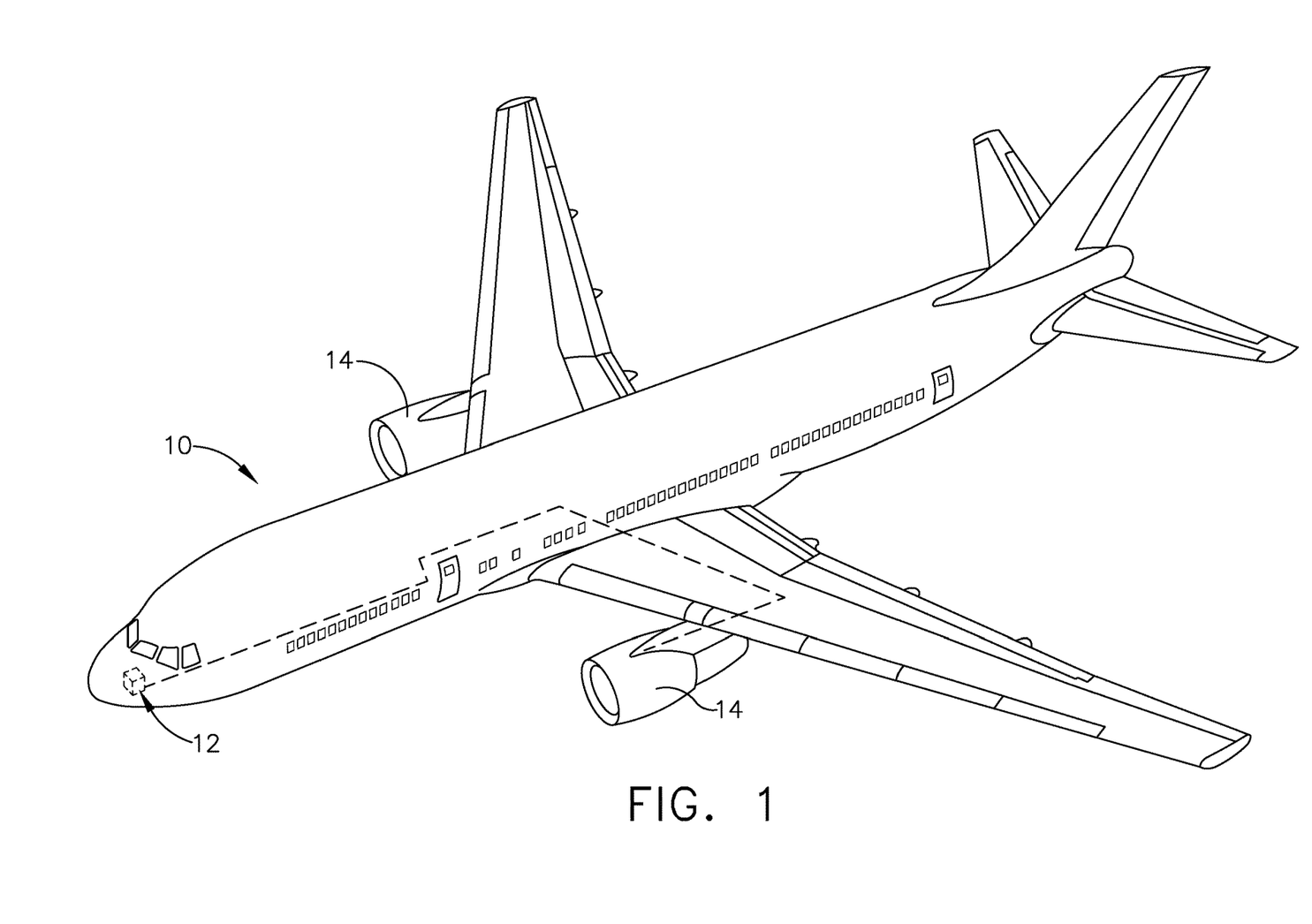
FIG. 1 is a schematic perspective view of an aircraft including a battery pack in accordance with various aspects described herein.

FIG. 1 schematically illustrates an aircraft 10 with an on-board battery pack 12 (shown in dashed line). The battery pack 12 can house battery elements useful in storing and providing electrical power throughout the aircraft 10, or providing auxiliary power as may be required. In one example, the battery pack 12 can be coupled to one or more turbine engines 14 on the aircraft 10. The turbine engine 14, in combination with thrust generation, can generate power which can be provided to the battery pack 12 for use or storage. It will be understood that the battery pack 12 can be located anywhere within the aircraft 10, not just the nose as illustrated. For example, there can be any number of battery packs 12 distributing power around the aircraft 10. While illustrated in a commercial airliner, the battery pack 12 can be used in any type of aircraft, for example, without limitation, fixed-wing, rotating-wing, rocket, commercial aircraft, personal aircraft, and military aircraft. Furthermore, aspects of the disclosure are not limited only to aircraft aspects, and can be included in other mobile and stationary configurations. Non-limiting example mobile configurations can include ground-based, water-based, or additional air-based vehicles. Any implementation has its own constraints and power requirements. As such, the design of the particular aspects of the battery pack 12 as described herein can be tailored to suit specific requirements of the particular implementation.

Figure 2:
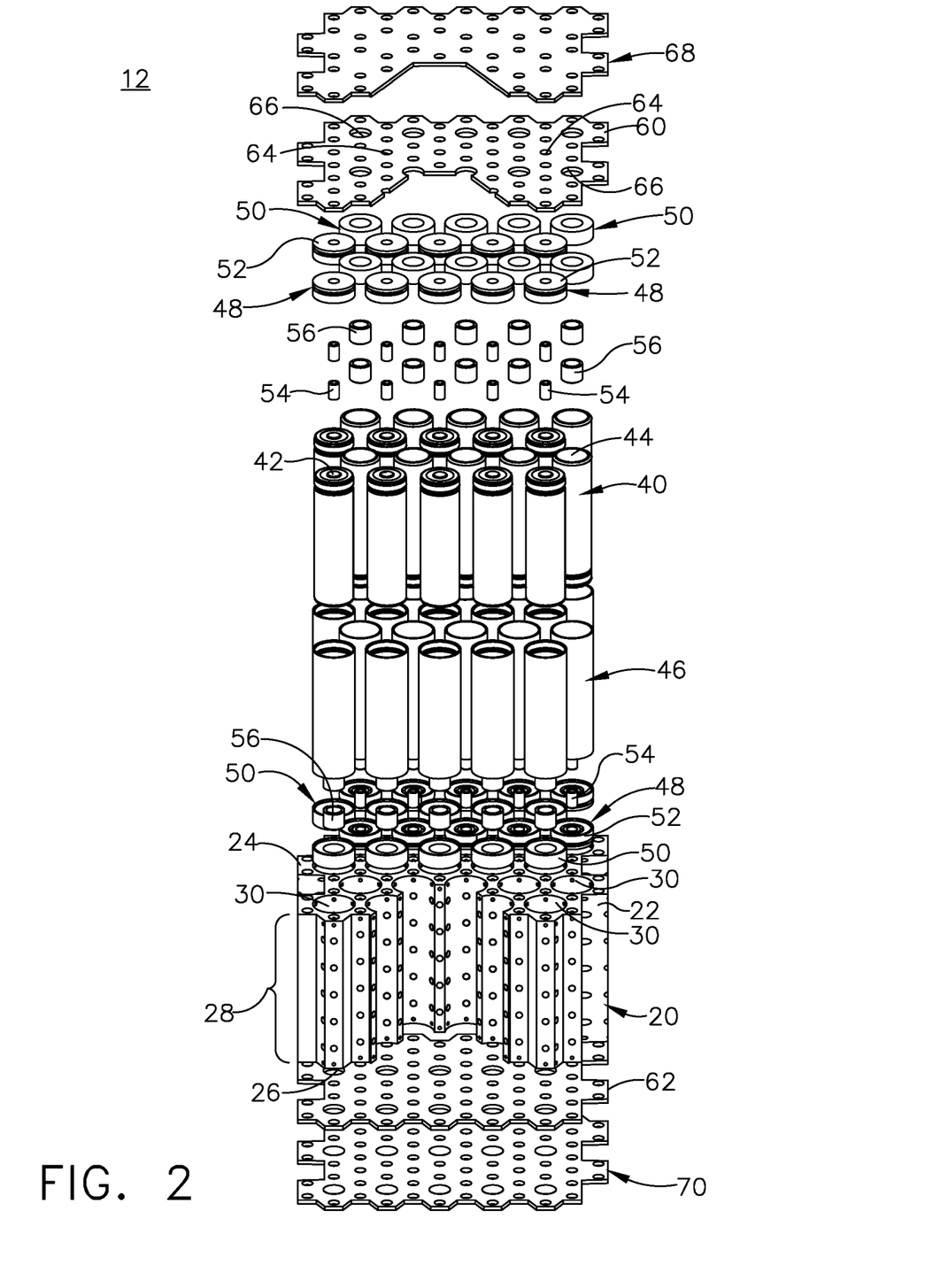
FIG. 2 is an exploded view of the battery pack of FIG. 1 in accordance with various aspects described herein.

Referring now to FIG. 2, an exploded view best illustrates the exemplary components forming the battery pack 12. A chassis 20 can include a body 22 including a first surface 24 and a second surface 26 opposite of the first surface 24. A vertical length 28 for the body 22 can be defined between the first surface 24 and the second surface 26. A set of vertical battery cell holders 30 can be formed in the body 22 and can extend between the first surface 24 and the second surface 26, and can be as long as the vertical length 28. An exemplary portion of the body 22 of the chassis 20 has been removed illustrating the interior configuration of the battery cell holders 30 for clarity. It should be appreciated that the chassis 20 can be formed to enclose all elements as shown in the exploded view of FIG. 2. It should be further appreciated that all battery cell holders 30 should be enclosed by the body 22, such that the battery cell holders 30 are open at the first and second surfaces 24, 26.

A set of battery cells 40, which can be Lithium Ion battery cells, in one non-limiting example, can be provided in the set of vertical battery holders 30. The battery cells 40 can include an anode end 42 and a cathode end 44. The battery cells 40 can be organized in an alternating manner such that some battery cells 40 have the anode end 42 oriented upward, while some have the cathode end 44 oriented upward. Such an organization is exemplary, and can be tailored to the particular needs of the particular battery pack 12.

A set of sleeves 46 can be sized to receive the battery cells 40. The sleeves 46 can be made from thermally conductive materials, which do not insulate the batty cells 40. The sleeves 46 can be sized for insertion within the set of vertical battery cell holders 30 relative to the set of battery cells 40. The sleeves 46 provide a thermal interface material to enhance thermal conduction between the battery cells 40 and the chassis 20 during operation. In one example, the thermal interface material of the sleeves 46 can breakdown at heightened temperatures to facilitate exhaustion of heat or gas generated by the battery cell 40.

An anode cap assembly formed as an anode cap 48 can be provided at the anode end 42 of the battery cells 40 and a cathode cap 50 can be provided at the cathode end 44 of the battery cells 40. The anode cap 48 can further include a grommet 52. The grommet 52 can be made of thermally and conductively insulated materials. A thermal fuse 54 can be provided in the anode cap 48 for electrically coupling the battery cells 40 at the anode end 42. The thermal fuse 54 can be configured to connect to a battery terminal and related circuitry. The thermal fuse 54 can be adapted to break the electrical connection between the battery cells 40 at a threshold temperature, such as at 120° C. in one non-limiting example. For example, the thermal fuse can be a spring or a conductive compressible foam element. A cathode coupler 56 can be provided at the cathode cap 50 for electrically coupling the cathode end 44 of the battery cells 40.

An upper insulator 60 can be provided at the first surface 24 of the body 22 and a lower insulator 62 can be provided at the second surface 26 of the body 22. The upper and lower insulators 60, 62 can be both thermally and electrically insulating. Small apertures 64 and large apertures 66 can be formed in the upper and lower insulators 60, 62 adapted to receive the thermal fuse 54 and the cathode coupler 56, respectively. They are sized to the battery cell contact areas.

An upper circuit board 68 can be provided adjacent the upper insulator 60, opposite of the body 22 and a lower circuit board 70 can be adjacent the lower insulator 62, opposite the body 22. The upper and lower circuit boards 68, 70 can be printed circuit boards, in one non-limiting example, and can include a plurality of electrical components, such as battery cell control and monitoring circuitry.

Figure 3:
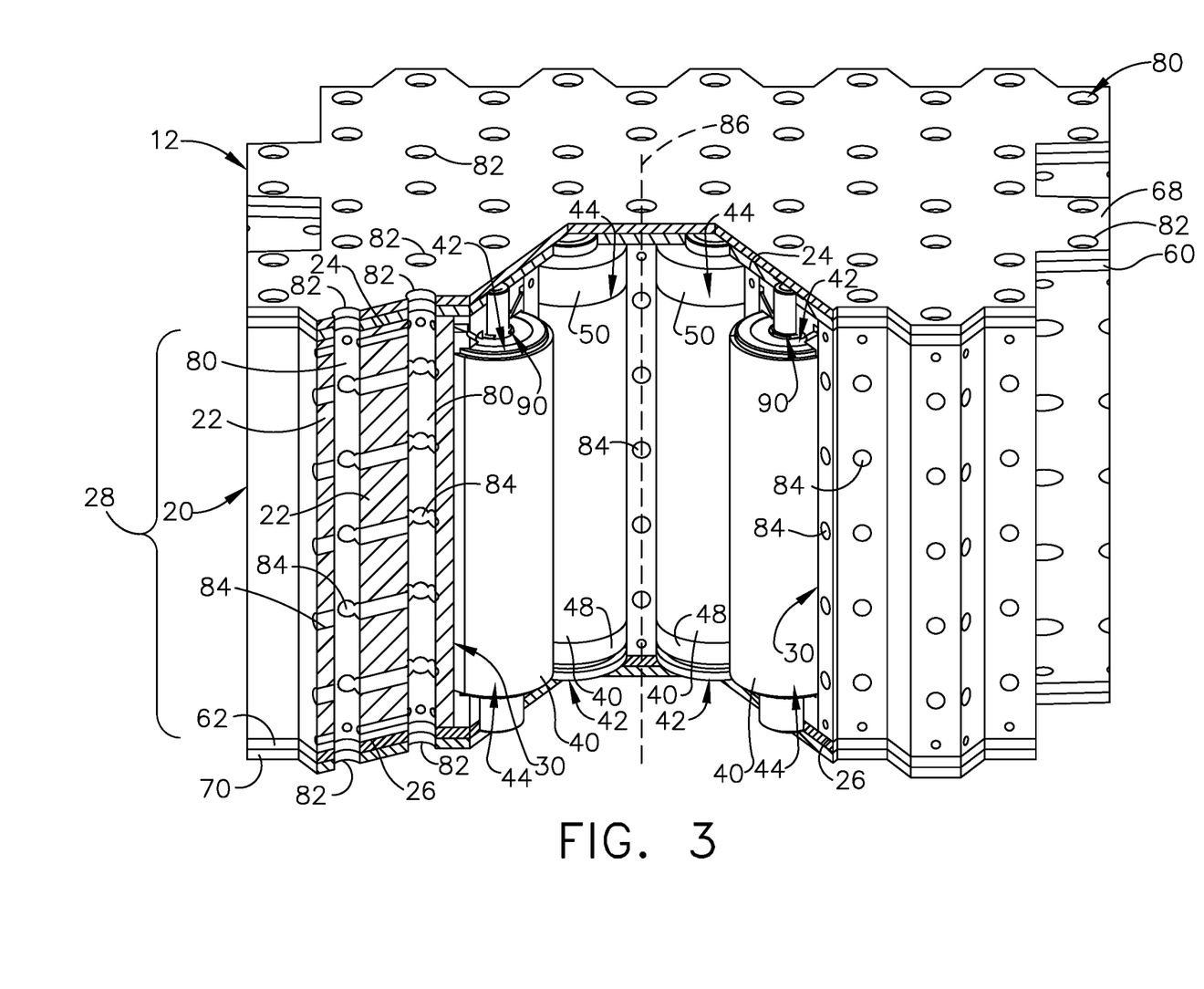
FIG. 3 is perspective view of the battery pack of FIG. 2 having a portion of a body removed exposing an interior organization including a set of lithium ion batteries.

Referring now to FIG. 3, a portion of the battery pack 12 is illustrated having a portion of the chassis 20 cut away, better illustrating the battery cells 40 provided within the set of vertical battery holders 30. The vertical stack of the battery pack 12 includes, from top to bottom as illustrated, the upper circuit board 68, the upper insulator 60, the body 22 including the set of vertical battery holders 30, the lower insulator 62, and the lower circuit board 70.

A set of vertical passages 80 are provided in the body 22 extending between the first surface 24 and the second surface 26, spaced from the set of vertical battery cell holders 30. In the illustrated example, the set of vertical passages 80 are located between three adjacent vertical battery cell holders 30. A set of complementary apertures 82 are provided in the upper and lower insulators 60, 62 and in the upper and lower circuit boards 68, 70, complementary to the set of vertical passages 80. The apertures 82 provide fluid communication to the set of vertical passages 80 through the insulators 60, 62 and the circuit boards 68, 70.

A set of horizontal passages 84 are also provided in the body 22 extending between a passage of the set of vertical passages 80 and a holder of the set of vertical battery holders 30. The set of horizontal passages 84 interconnects at least two adjacent vertical battery holders 30 via the adjacent vertical passage 80. Similarly, the set of vertical passages 80 interconnections the set of horizontal passages 84. Additionally, the set of horizontal passages 84 can interconnect adjacent vertical passages 80. As such, each vertical battery holder 30 can couple to six adjacent vertical passages 80 via the sets of horizontal passages 84 and each vertical passage of the set of vertical passages 80 can couple to three vertical battery holders 30 and three adjacent vertical passages 80.

The set of horizontal passages 84 are spaced along at least a portion of the vertical length 28 of the body 22. Such spacing can be equal spacing, and can be consistent heights relative to the vertical length 28 of the body 22. For example, the set of horizontal passages 84 can be disposed at substantially the same lateral positioning relative to the vertical length 28 of the body 22 on multiple sides of the set of vertical battery holders 30. Alternatively, it is contemplated that the set of horizontal passage 84 can be offset, or variably spaced, such as having a greater concentration of horizontal passages 84 toward the center of the vertical battery cell holders 30, or toward either end 42, 44 of the battery cells 40. Furthermore, it is contemplated that one or more horizontal passages of the set of horizontal passages 84 are disposed at an angle, relative to a vertical axis 86 defined by an adjacent vertical passage 80. Such an angle can be relative to a flow direction through the set of horizontal passages 84. It is further contemplated that the horizontal passages 84 can have variable widths or cross-sectional areas, or can have different shapes or sizes. Such shaping or sizing can be tailored to the particular needs of the battery pack 12, such as anticipated local temperatures.

The anode end 42 of the battery cell 40 includes a vent 90, permitting the release of gases such as hydrocarbon gases that are released during electrolyte decomposition, for example. The anode caps 48 can be adapted to permit the release of such gases from the vent 90 to the set of vertical battery holders 30.

Figure 4:
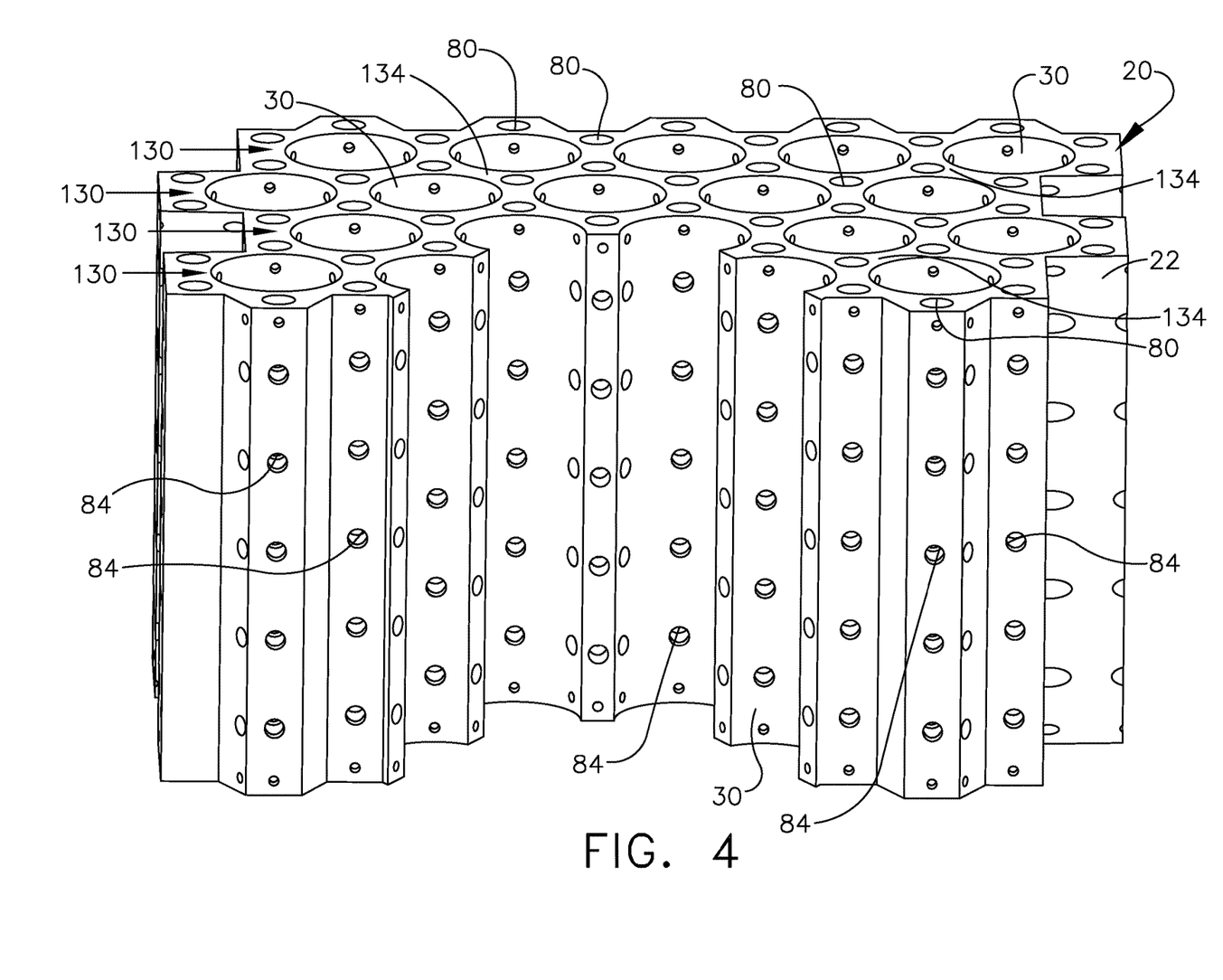
FIG. 4 is a perspective view of the body of FIG. 2 including a set of horizontal passages and a set of vertical cooling passages in accordance with various aspects described herein.

Referring now to FIG. 4, the body 22 is illustrated as including the set of vertical battery holders 30 organized into rows 130. The rows 130 are offset from one another, to define a set of corners 134 in a hexagonal organization. The vertical passages 84 can be positioned in the corners 134. As such, the horizontal passages 84 can form a hexagonal pattern around each of the vertical battery holders 80.

The set of vertical passages 80 are spaced within the body 22 between three adjacent vertical battery holders 30 defining the corner 134. The set of horizontal passages 84 couples each vertical passage 80 to the three surrounding vertical battery holders 30. While only coupling each vertical passage 80 to three vertical battery holders 30, there are a total of six vertical passages around each vertical battery holder 30.

Figure 5:
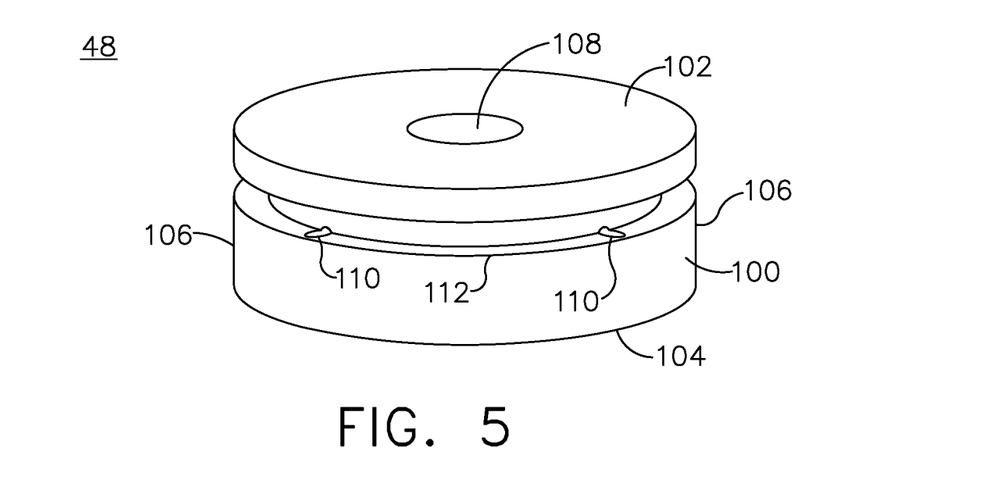
FIG. 5 is a perspective view of a cap assembly for use in the battery pack of FIG. 3 in accordance with various aspects described herein.

Referring now to FIG. 5, the anode cap 48 includes a body 100 having a first end 102, a second end 104, and a sidewall 106 extending between the first end 102 and the second end 104. A through opening 108 is provided in an interior of the body 100, extending between the first end 102 and the second end 104. The through opening 108 provides for electrically connecting the battery cell 40 at the anode end 42, such as with the thermal fuse 54 of FIG. 2. A set of passages 110 are provided in the body 100. While only two passages 110 are visible, any number of passages 110 is contemplated. An annular groove 112 is provided in the sidewall 106 and fluidly couples to the set of passages 110. The annular groove 112 can separate the sidewall 106 into an upper flange and a peripheral portion of the body 100 to define a peripheral gap as the annular groove 112.

Figure 6:
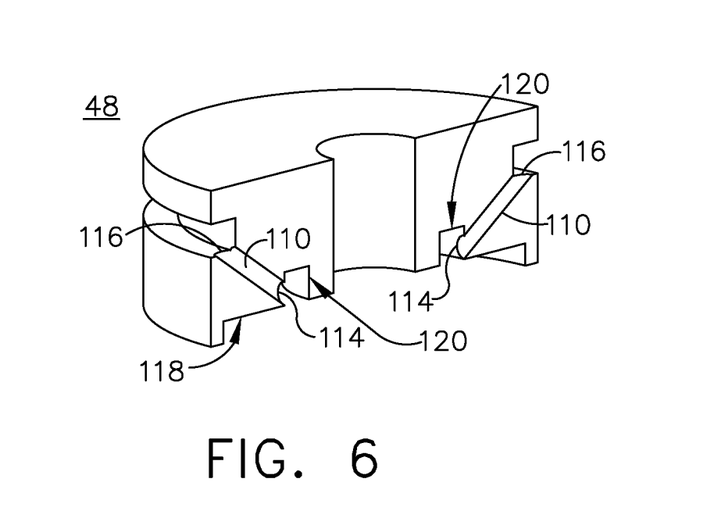
FIG. 6 is a cross-sectional view of the cap assembly of FIG. 5 taken across section 5-5.

Referring now to FIG. 6, a section view of the anode cap 48 better illustrates the set of passages 110. Each passage of the set of passages 110 includes an inlet 114 and an outlet 116. A recessed area 118 can be formed at the second end 104, including an annular channel 120 formed within the body 100 at the recessed area 118. The recessed area 118 and the annular channel 120 can be adapted to the shape of the anode end 42 of the battery cell 40. The inlet 114 for the set of passages 110 can be provided in the annular channel 120, with the outlets 116 provided on the groove 112.

The recessed area 120 can fluidly communicate with the vent 90 of the battery cell 40 of FIG. 3. The anode cap 48 can provide for exhausting of released gases from the battery cell 40 via the vent 90 through the passages 110 and through the groove 112, where the released gases can be provided to the vertical battery holder 30 encasing the battery cell 40, such as that shown in FIG. 3.

Figure 7:
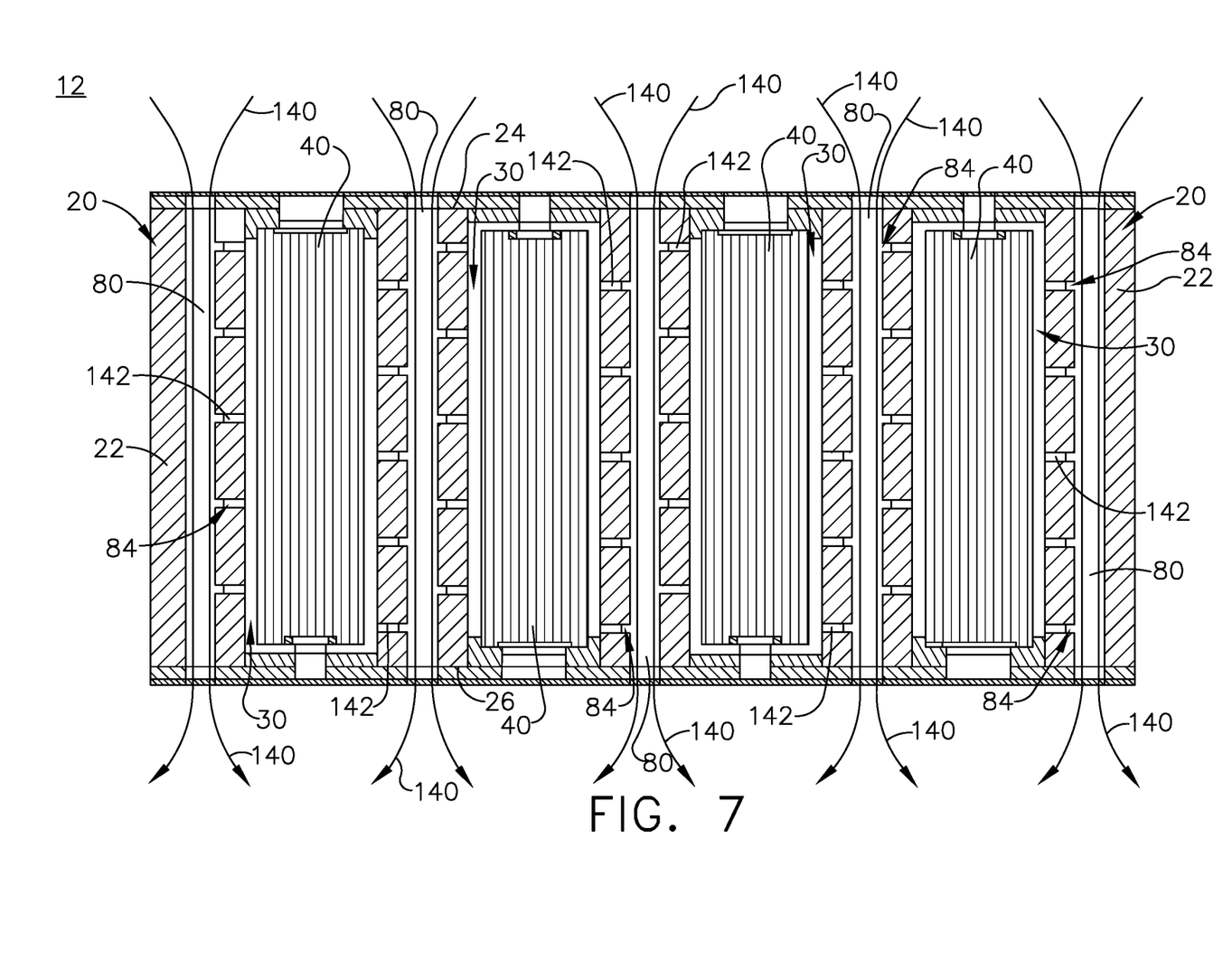
FIG. 7 is a schematic section view of the battery pack of FIG. 3 illustrating airflow passing through the vertical cooling passages of FIG. 6.

Referring now to FIG. 7, a cooling air input as a flow of fluid 140, such as a flow of cool air, can be provided through the set of vertical passages 80 from the first surface 24 to the second surface 26. The cooling air input can be provided by a volume of air ducted to the battery pack, such as drawn off the engine in an avionics implementation. Alternatively, a flow in the opposite direction is contemplated or flows in a combination of directions. The flow of fluid 140 can be a cool fluid, relative to the operational temperatures of the battery pack 12, in order to cool the battery pack 12. Such cooling of the battery pack 12 can be achieved by convectively cooling the body 22 of the chassis 20.

A phase change material 142 can be provided in the set of horizontal passages 84, such as wax in one exemplary, non-limiting example. The phase change material 142 can be adapted to seal the set of vertical battery holders 30 from the flow of fluid 140 and the set of vertical passages 80. The phase change material 142 can be a solid material, adapted to change phase to a liquid or a gas at a desired threshold temperature, fluidly coupling the adjacent vertical battery holder 30 to the adjacent vertical passage 80 through the horizontal passages 84.

Figure 8:
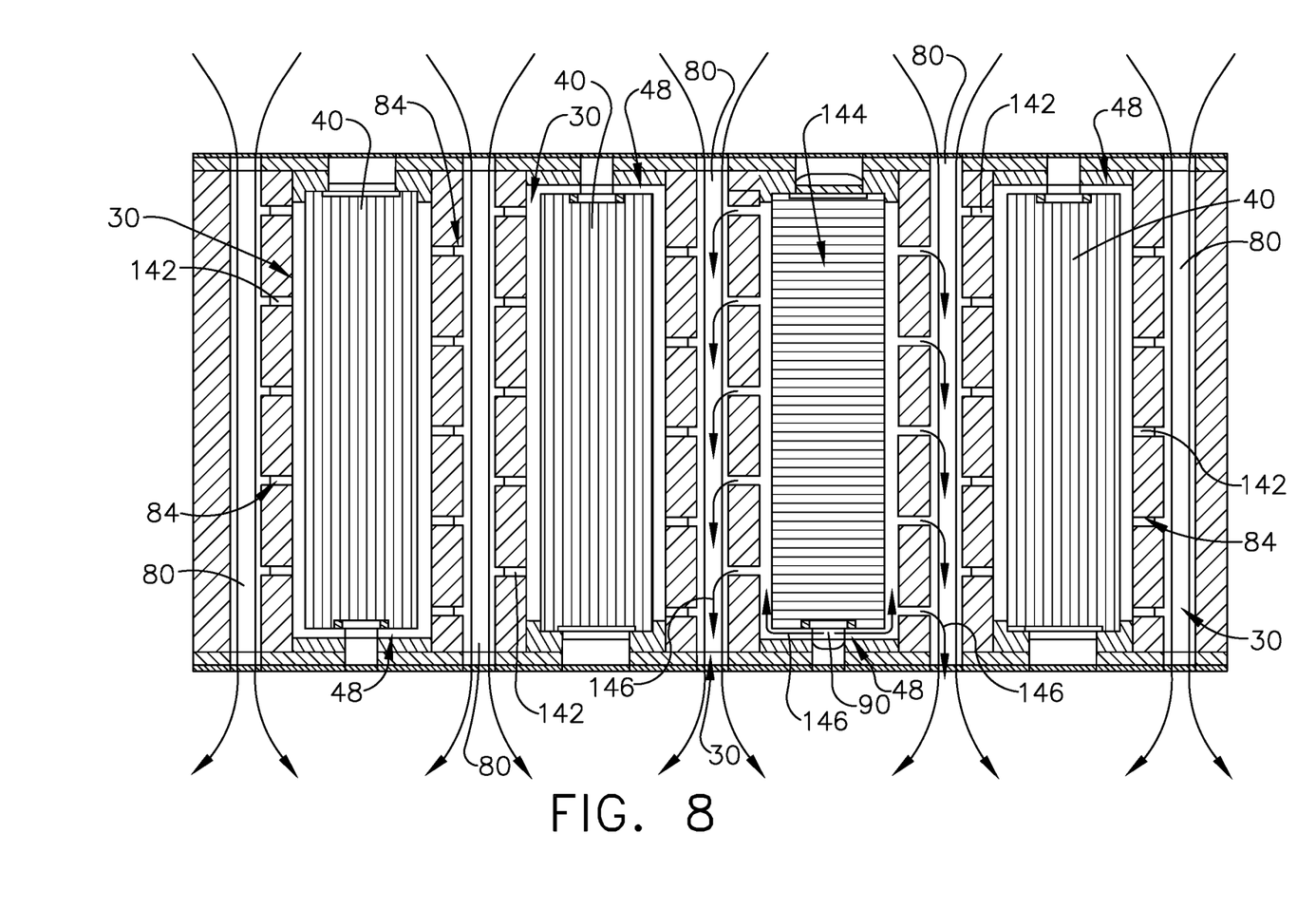
FIG. 8 is a section view of the battery pack of FIG. 7 illustrating removal of heat from one lithium ion battery through adjacent vertical cooling passages in accordance with various aspects described herein.

Referring now to FIG. 8, one exemplary battery cell 40, illustrated with horizontal section lines, can begin the cell breakdown process, as a decomposing cell 144. During the breakdown process, the decomposing cell 144 experiences increasing temperatures, starting at about 80° C. and increasing therefrom as the breakdown process continues. It will be understood that the breakdown process can start at temperatures less than 80° C. and that such temperature is exemplary.

At cell breakdown, gases 146, such as hydrocarbon gases, can be released from the battery cell 40 through the vent 90 to the anode cap 48, entering the space in the vertical battery holder 30 around the battery cell 40. The released gases can have the heightened temperature of the decomposing cell 144, enough to result in a phase change of the phase change material 142 from solid to another state of matter. The phase change material 142 can be adapted to change phase from solid to a liquid or gaseous phase, passing out of the set of horizontal passages 84 to the adjacent vertical passages 80, fluidly coupling the vertical battery holder 30 containing the decomposing cell 144 to the adjacent vertical passages 80. It is alternatively contemplated that the phase change material 142 can pass into the vertical battery holder 30 as opposed to the vertical passage 80. After the phase change of the phase change material 142, the escaping gases 146, can be released through the horizontal passages 84 to the adjacent vertical passages 80. From there the flow of fluid 140 can remove the escaping gases 146.

It should be appreciated that the phase change material 142 permits the exhaustion of the released gases 146 from the vertical battery holder 30, which can be tuned to release the gases based upon a threshold breakdown temperature of the phase change material 142. Exhausting the released gases via the flow of fluid 140 passing through the vertical passages 80 provides for mixing any combustible gases with non-combustible gases. Similarly, the potential for increasing pressures contained within the vertical battery holders 30 is eliminated, as the removal of the phase change material allows for egress of the collection of gases, preventing a pressure build-up within the vertical battery holder 30 or within the battery cell 40. As such, it is further contemplated that the phase change material 142 can be pressure sensitive, adapted to displace into the vertical passages 80 at a threshold pressure to prevent excessive pressure build-up.

Furthermore, the flow of fluid 140 can provide for cooling of the battery pack 12 adjacent to the decomposing cell 144, which can slow decomposition of the battery cells 40 by reducing local temperatures. Further still, exhausting of heated gases can slow or prevent the negative impact of one decomposing cell 144 from spreading to adjacent battery cells 40, or can reduce the incidence of failure of the entire battery pack 12 resulting from the decomposition of a single battery cell 40.

In one additional example, the phase change material 142 at adjacent battery cells 40 could be oriented such that heated gas from an adjacent decomposing battery cell 40 causes the adjacent phase change material 142 to melt, facilitating the release of gas and heat for battery cells 40 adjacent to the failing battery cell 40. Such melting could help prevent increasing temperatures or pressures in the adjacent battery cells 40, and further reduce the incidence of failure around a failing cell.

Figure 9:
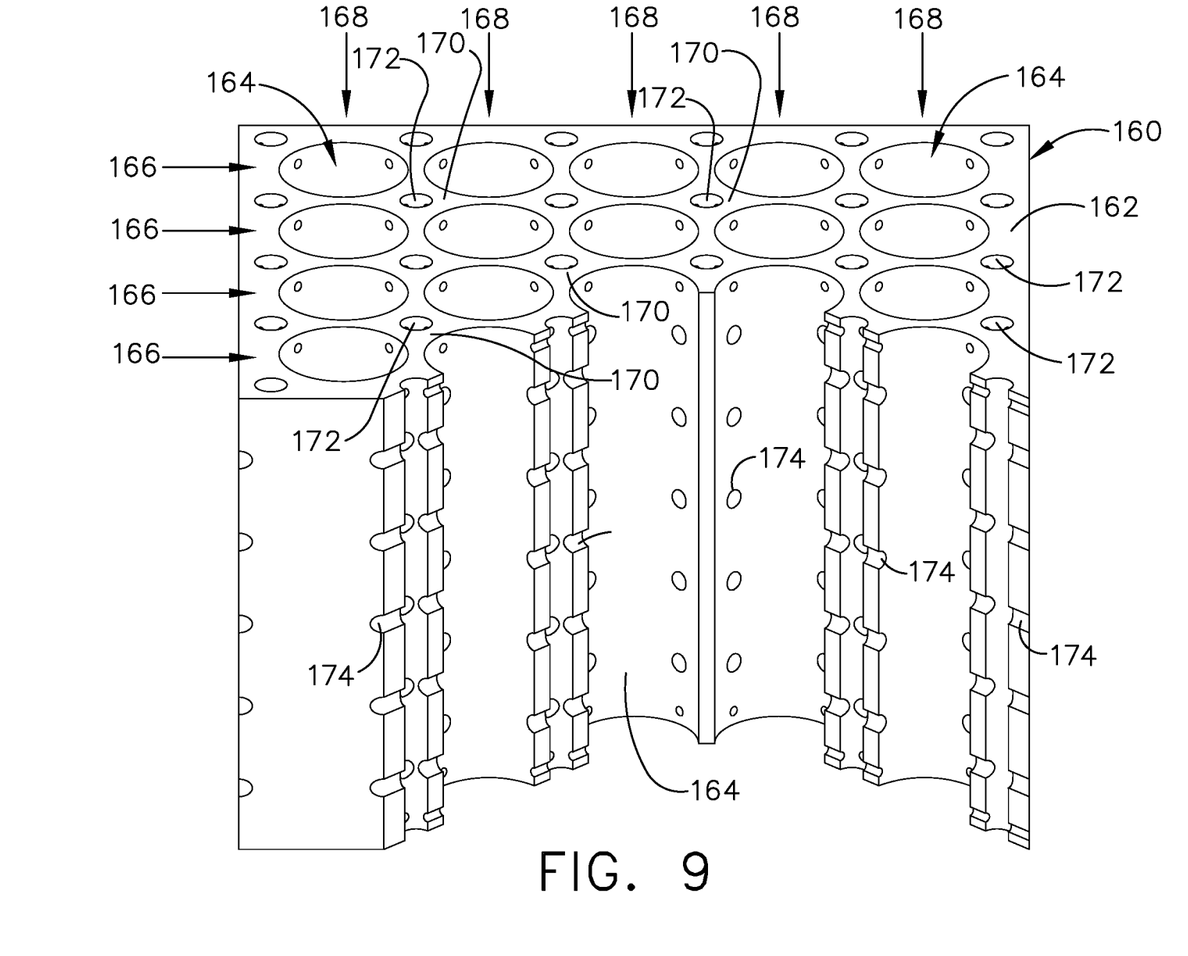
FIG. 9 is a perspective view of an alternative body for use in the battery pack of FIG. 1 including a grid organization for a set of vertical cooling passages in accordance with various aspects described herein.

Referring now to FIG. 9, an alternative exemplary chassis 160 can include a body 162 with a patterned organization having aligned rows 166, defining columns 168. An exemplary set of vertical battery holders 164 can be organized into the rows 166 and columns 168, defining a corner 170 at a junction between four adjacent vertical battery holders 164. One vertical passage of a set of vertical passages 172 can be provided at the corners 170, while it is contemplated that more than one vertical passage 172 can be provided at each corner 170, or can be positioned within areas of the body 162 away from defined corners.

Each vertical passage 172 can fluidly couple to each of the four adjacent vertical battery holders 164 via a set of horizontal passages 174. Similarly, each vertical battery holder 164 can couple to four adjacent vertical passages 172 via the horizontal passages 174.

Alternatively, it is contemplated that a chassis for a battery pack defining a body can have any suitable organization, having any number of vertical battery holders surrounded by any number of vertical passages including connecting horizontal passages. As such, a variety of configurations are contemplated, and should not be limited to the examples as illustrated in FIG. 4 or 9.

Figure 10:
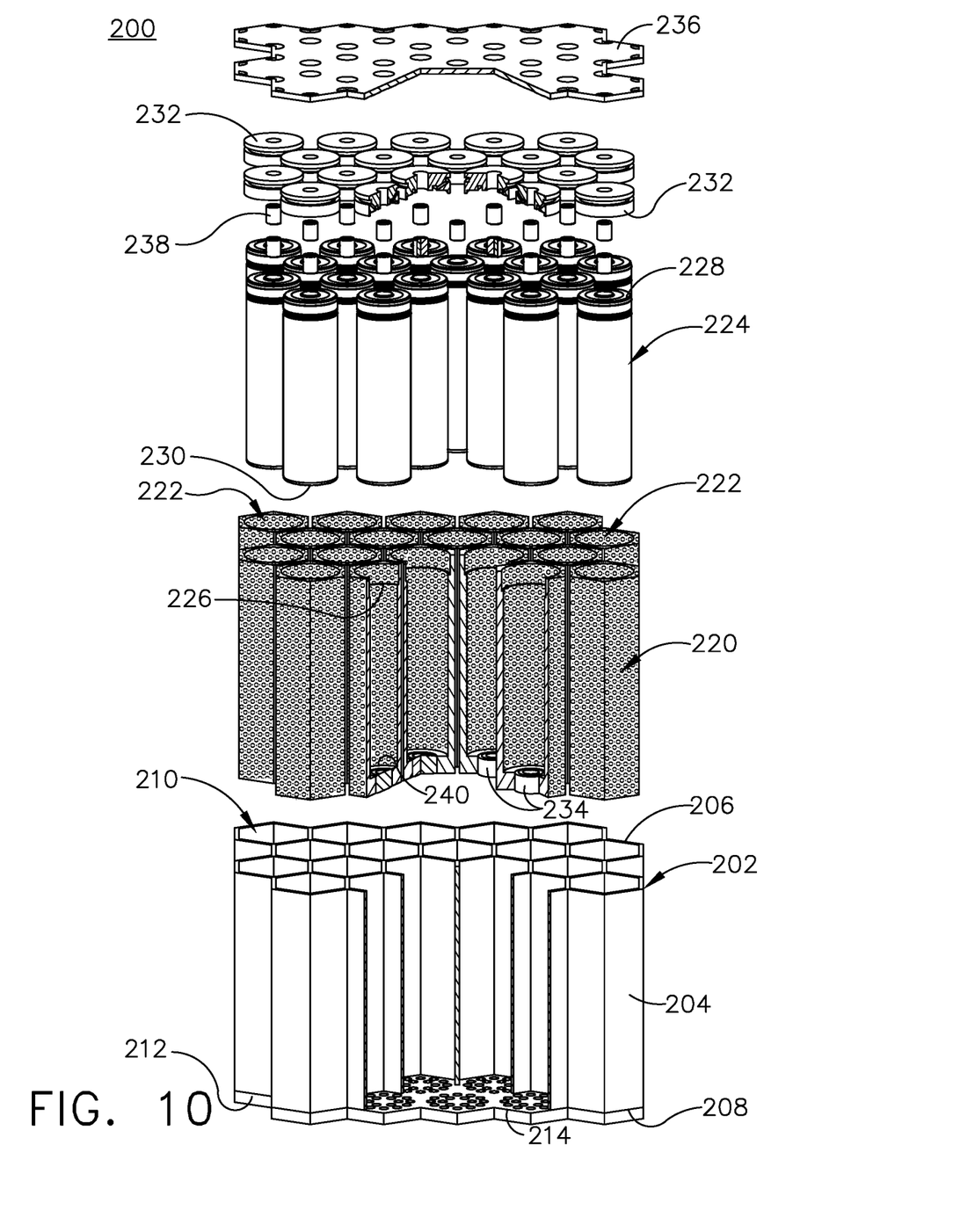
FIG. 10 is an exploded view of an alternative battery pack assembly in accordance with various aspects described herein.

Referring now to FIG. 10, another exemplary battery pack 200 is illustrated, which can be utilized within the aircraft 10 of FIG. 1, for example. Portions of the battery pack 200 are sectioned for clarity of understanding, while it should be understood that a complete battery pack 200 is not sectioned. A chassis 202 defines a body 204 for the battery pack 200. The body 204 can include a first surface 206 and a second surface 208 opposite of the first surface 206. A set of hexagonal-shaped vertical battery cell holders 210 are formed in the body 204. While illustrated has having hexagonal shapes, it should be contemplated that the vertical battery cell holders 210 can have any shape, such as cylindrical in one alternative, non-limiting example. The body 204 is shown having a portion sectioned away to illustrate a base 212 provided on one end of the body 204 that can form the second surface 208. A set of apertures 214 can be provided in the base 212, fluidly coupling the vertical battery cell holders 210 to the exterior of the chassis 202 through the base 212. The apertures 214 can permit a flow of air to pass into the interior of the chassis 202 for passing air around the battery cell holders 210. The apertures 214 can be formed in a pattern, in one non-limiting example. While the base 212 is illustrated as integral with the body 204, it should be appreciated that the base 212 can be a separate element that is attached to the body 204.

A set of electrically conductive mesh elements 220 can be shaped for insertion into the set of vertical battery cell holders 210. The electrically conductive mesh 220 can have a high melting point, such as having a melting point greater than that of the maximum anticipated temperature of a failing battery cell. The mesh 220 can be shaped complementary to the vertical battery cell holders 210, and can include a central passage 222, adapted to hold one or more battery cells 224. The mesh 220 can be formed with a lip 226, adapted to conform to the battery cells 224. The mesh 220 can further include an annular seat 240, adapted to support an end of the battery cells 224. The mesh elements 220 can be porous, permitting a flow of air to pass through the mesh elements 220, such as fed from the apertures 214. As such the mesh elements 220 can be thermally conductive, providing low resistance to the flow of fluid through the mesh elements 220. Similarly, the mesh elements are electrically conductive to simultaneously provide for the passing of an electric current and a flow of fluid through the mesh elements 220.

The set of battery cells 224 can include an anode end 228 and a cathode end 230. An anode cap 232 can be provided at the anode end 228 and a cathode cap 234 can be provided at the cathode end 230, for electrically coupling the battery cells 224 to a circuit. The lip 226 of the mesh 220 can be sized to the anode cap 232. The anode caps 232, in one non-limiting example, can be the anode caps 48 discussed in FIGS. 5 and 6.

A circuit board 236, such as a printed circuit board, is provided at the first surface 206 for electrically coupling the battery cells 224. A thermal fuse 238 can be provided in the anode caps 232 to electrically couple the battery cells 224 to the circuit board 236, while adapted to disconnect the battery cells 224 from the circuit board 236 at a threshold temperature. The mesh 220 is electrically conductive and can provide a path for the cathode end 230 to electrically couple to the circuit board 236 adjacent the anode end 228, without requiring a circuit board at both ends of the battery pack 200. Additionally, the mesh 220 is porous, providing an airflow path for forced air cooling and gas ventilation.

Figure 11:
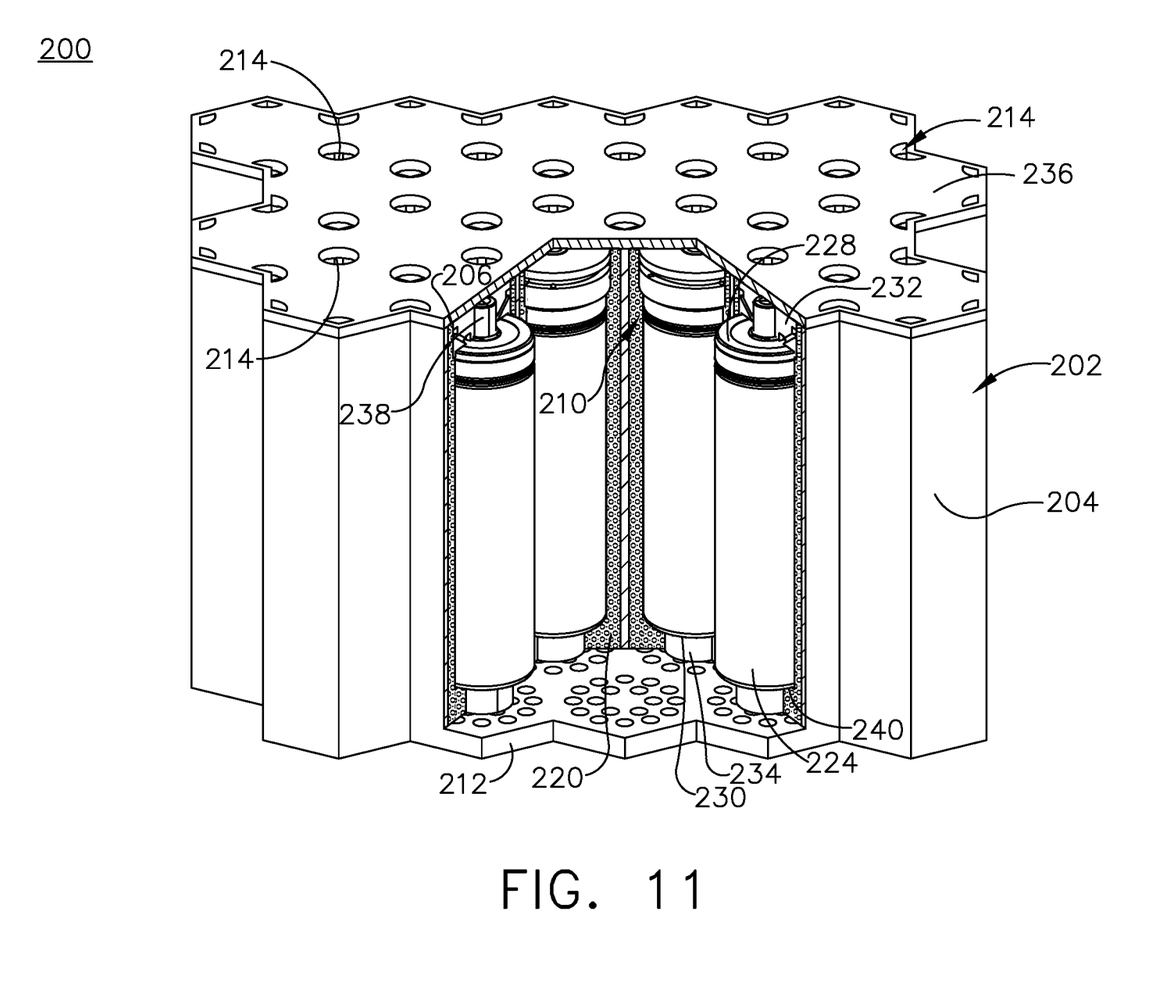
FIG. 11 is a perspective view of the battery pack of FIG. 10, having a portion of the body removed to illustrate the interior assembly of the battery pack.

Referring now to FIG. 11, the assembled battery pack 200 is shown with a portion cut away to better illustrate the combined configuration of the battery pack 200. The body 204 can be shaped and sized to hold any number of battery cells 224 in any configuration, with the cathode end 230 and the cathode cap 234 resting on the base 212. The mesh 220 can surround the battery cells 224 as well as the anode end 228, the cathode end 230, the anode cap 232, and the cathode cap 234. The circuit board 236 encloses the battery cell holders 210 at the first surface 206 of the body 204.

The body 204, in one non-limiting example, can be made by extrusion. The battery cell holders 210 can be identical, permitting patterning in order to form a body 204 supporting a battery pack 200 for any number of battery cells 224.

Alternatively, it is contemplated that the body 204 can be made by additive manufacturing or any other suitable method. They body 204 can be made of a material having low thermal conductivity and a high melting point. The low thermal conductivity and high melting point act as a firewall between adjacent cells, while the porous mesh 220 provides for fluid exhausting and forced-air cooling within each cell.

In the event that a battery cell 224 begins to decompose, the increased heat and pressure can be relieved by the forced-air cooling passing through the mesh 220. In the event that a cell decomposes generating a failure or significant temperatures, the firewall created by the body 204 protects adjacent cells from damage, while providing a barrier from transferring heat to the adjacent cells, which may otherwise exacerbate failure of other adjacent battery cells 224 local to the failed cell. As such, the failure of one battery cell 224 is prevented from disturbing the rest of the battery pack 200.

It should be appreciated that the battery packs having chassis defining bodies as described herein provide for improved designs for battery packs for adapting to failure of a battery cell, while minimizing or mitigating negative impacts to adjacent battery cells or the entire battery pack. As such, replacement of a single battery cell is permitted, as opposed to replacement of the entire battery pack, which reduces cost.

Additionally, it should be appreciated that the cap and grommet as described herein provides for a cap at the anode end of a battery cell that provides for thermally and electrically insulating the battery cell while permitting exhaustion of gases released from the battery cell during cell breakdown. As such, temperatures and internal pressures are minimized, mitigating the negative effects of breakdown of a single battery cell to the rest of the battery pack.

Many other possible embodiments and configurations in addition to that shown in the above figures are contemplated by the present disclosure. To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose embodiments of the disclosure, including the best mode, and also to enable any person skilled in the art to practice embodiments of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A chassis for a battery pack, comprising:
   a body defining a first surface and a second surface, opposite and spaced from the first surface;
   a set of vertical battery cell holders located within the body and extending between the first surface and the second surface;
   a set of horizontal passages located within the body and interconnecting at least two adjacent battery cell holders of the set of vertical battery cell holders and where the set of horizontal passages are spaced along at least a portion of a vertical length of the body;
   a phase change material located in at least one of the set of horizontal passages; and
   a set of vertical cooling passages located within the body and extending between the first surface and the second surface and where one vertical cooling passage is located between at least two adjacent of the set of vertical battery cell holders and vertically connects the set of horizontal passages that are spaced along at least a portion of a vertical length of the body.

2. The chassis of claim 1 wherein the set of horizontal passages interconnect four adjacent of the set of vertical battery cell holders.

3. The chassis of claim 1 wherein the phase change material changes phase to a liquid at 150° C. to 200° C.

4. The chassis of claim 1, further comprising a cooling air input configured to operably couple to the set of vertical cooling passages and provide a flow of cooling fluid.

5. The chassis of claim 4 wherein the set of horizontal passages is vertically angled toward a direction of the flow of cooling fluid.

6. The chassis of claim 1 wherein the sets of horizontal passages are disposed at substantially the same lateral positioning on multiple sides of one battery cell holder of the set of vertical battery cell holders.

7. The chassis of claim 1 wherein the set of vertical cooling passages include six vertical cooling passages located around one vertical battery cell holder of the set of vertical battery cell holders.

8. The chassis of claim 7, further comprising an additional set of horizontal passages extending between two adjacent of the set of vertical cooling passages.

9. The chassis of claim 1, further comprising a set of lithium-ion battery cells located within the set of vertical battery cell holders.

10. The chassis of claim 9, further comprising an insulating grommet operably coupled to a lithium-ion battery cell and located within one vertical battery cell holder of the set of vertical battery cell holders where the insulating grommet comprises a body defining a first end and a second end with a through opening therein passing from the first end of the body to the second end of the body and a set of passages that extend from the first end radially outward towards the set of horizontal passages.

11. A chassis for a battery pack, comprising:
    a body defining a first surface and a second surface, opposite and spaced from the first surface;
    a set of vertical battery cell holders located within the body and extending between the first surface and the second surface;
    an electrically conductive mesh located within a battery cell holder of the set of vertical battery cell holders and configured to surround a battery cell; and
    an insulating grommet located within a vertical battery cell holder of the set of vertical battery cell holders where the insulating grommet comprises a body defining a first end and a second end with a through opening therein passing from the first end of the body to the second end of the body and a set of passages that extend from a first the first end radially outward to a second portion towards the set of vertical battery cell holders.

12. The chassis of claim 11, further comprising a cooling air input configured to operably couple to the set of vertical battery cell holders and provide a flow of cooling air.

13. The chassis of claim 11, further comprising a plate fastened to the second surface of the body and having multiple through openings fluidly coupled to a battery cell holder of the set of vertical battery cell holders.

14. A cap assembly for a lithium ion battery, comprising:
  an insulating grommet having a body defining a first end and a second end with a through opening therein passing from the first end of the body to the second end of the body and a set of passages that extend from a first portion radially outward to a second portion.

15. The cap assembly of claim 14 wherein the body is generally cylindrical.

16. The cap assembly of claim 15 wherein the body further comprises an upper flange defining the second end of the body and wherein a periphery of the upper flange is spaced from a peripheral portion of the body to define a peripheral gap.

17. The cap assembly of claim 16 wherein the set of passages extend from the first end to the peripheral gap.

18. The cap assembly of claim 14, further comprising a conductive foam element or a spring located in the through opening and configured to connect to a battery terminal and circuitry.

* * * * *